April 15, 1941.  E. J. SCOTT ET AL  2,238,294
TYPEWRITER STAND
Filed Sept. 23, 1939
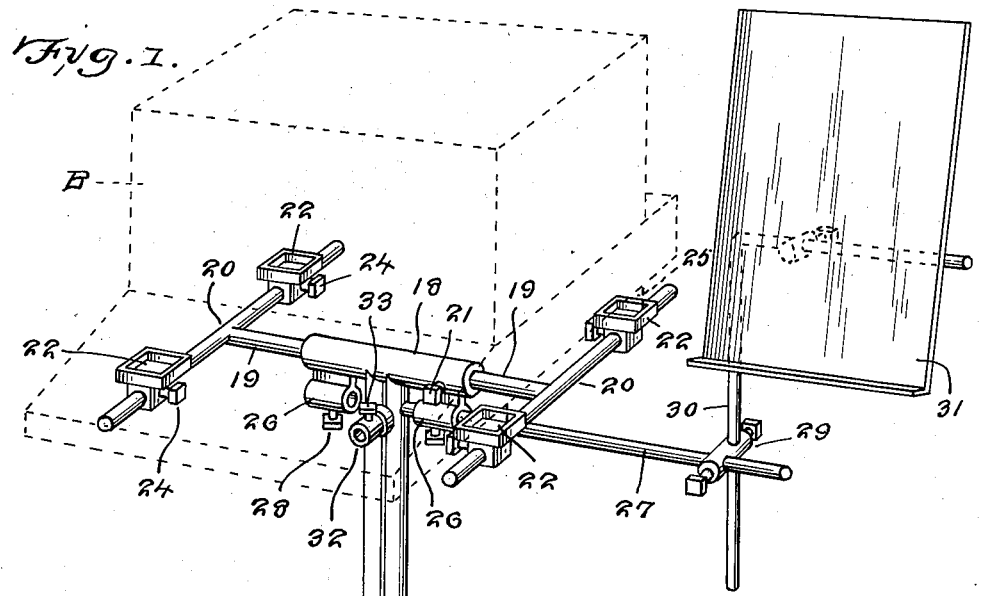
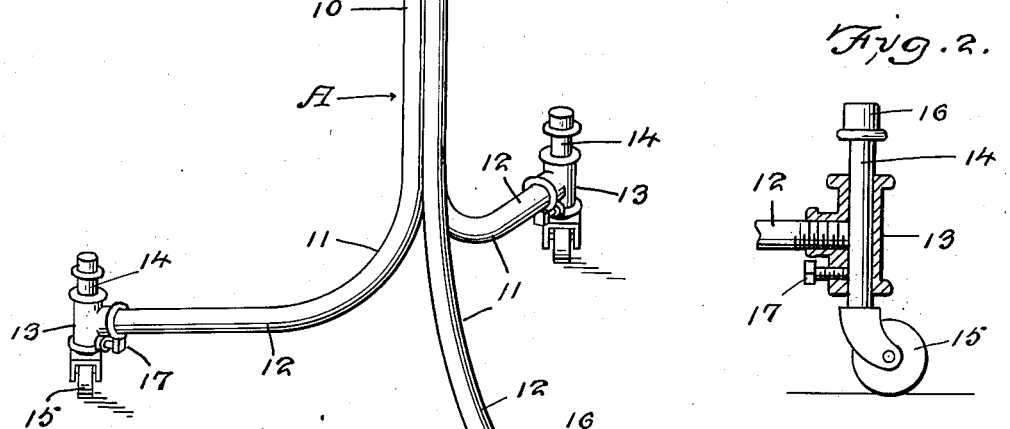
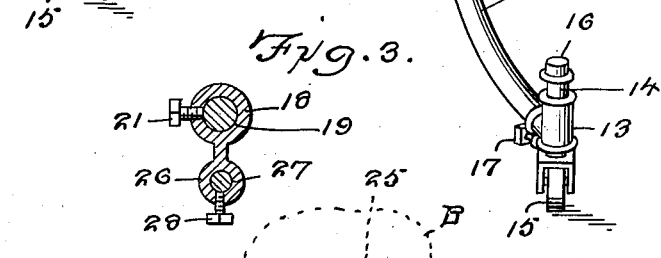
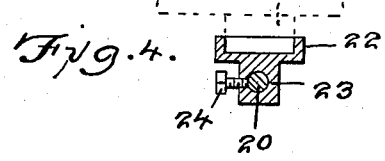
Inventor
Elmer J. Scott
Edward T. Nyssen
By Paul J. Parker
Attorney Patented Apr. 15, 1941

2,238,294

UNITED STATES PATENT OFFICE 2,238,294

TYPEWRITER STAND

Elmer J. Scott and Edward T. Nissen,
Denver, Colo.

Application September 23, 1939, Serial No. 296,318

5 Claims. (Cl. 248—13)

The invention relates to a portable stand and more especially to an adjustable typewriter stand.

The primary object of the invention is the provision of a stand of this character wherein the frame thereof is a tripod carrying caster wheels or rollers and such tripod is susceptible of adjustment so as to take care of slight variations in the level of a floor supporting the same, the said stand being capable of movability from one locality to another and it will support a typewriter without liability of the accidental falling of the typewriter from the stand or displacement of the same upon the stand.

Another object of the invention is the provision of a stand of this character wherein the rubber feet of a typewriter are socketed so that the typewriter resulting from vibration thereof in its use will not become disturbed or displaced upon the stand, the erasure particles being not trapped upon the stand in the use of the typewriter because it lacks a table or slab usually employed for the base of the typewriter in the ordinary typewriter desks, stands or the like and in this manner there is less liability of the typewriter becoming clogged or filled with dirt or erased particles through continued use of such typewriter.

A further object of the invention is the provision of a stand of this character wherein its construction avoids noisy vibrations incident to the use of a typewriter when upon the same, the stand being susceptible of adjustment to meet the requirements of a user thereof and also is augmented by a work holder, the latter being susceptible of adjustment meeting the requirements of an operator of the typewriter.

A further object of the invention is the provision of a stand of this character which is extremely simple in its construction, comparatively light in weight yet strong and durable, thoroughly reliable and efficient in operation, easy of adjustment, neat in appearance, showing a firm support for a typewriter, the adjustment being for the purpose of taking care of different standard makes of typewriters, and inexpensive to manufacture.

With these and other objects in view, the invention consists in the features of construction, combination and arrangement of parts as will be hereinafter more fully described, illustrated in the accompanying drawing which discloses the preferred embodiment of the invention, and pointed out in the claims hereunto appended.

In the accompanying drawing:

Figure 1 is a perspective view of the stand constructed in accordance with the invention showing by dotted lines fragmentary, a typewriter thereon.

Figure 2 is a fragmentary vertical sectional view through the lower end of the leg of the stand.

Figure 3 is a fragmentary vertical sectional view through the stand.

Figure 4 is a detailed sectional view through one of the adjustable foot cups of the stand for the typewriter.

Similar reference characters indicate corresponding parts throughout the several views in the drawing.

Referring to the drawing in detail A designates generally the stand constructed in accordance with the invention and B denotes the fragmentary portion of a typewriter used upon the stand and is illustrative of one of a series of standard types.

The stand A comprises a three-legged tripod involving vertically arranged straight upper tubular portions 10, these being grouped in contacting relation to each other to provide the pedestal of the said triple leg tripod. These portions 10 are bent outwardly following a curvature 11 to provide the lower lateral radially outwardly disposed lower portions 12, being in the same horizontal plane with each other and at the outer ends are T-unions 13 providing sleeve-like bearings, vertically disposed and slidably accommodating therein vertical tubular stems 14. At the lower ends of the stems 14 are swiveled caster wheels or rollers 15 while the upper ends of said stems have fitted thereto caps 16. The bearings 13 have tapped therein set screws 17 engageable with the stems 14 to hold the same fixed in vertically adjusted positions, the set screws 17 being at the innermost sides of the bearings 13.

The vertical portions 10 are united by welding or otherwise throughout a major extent thereof. At the upper ends of the portions 10 is a horizontally disposed tubular cross head 18 which at its central portion is welded or otherwise secured to the said portions 10. Accommodated in the opposite ends of this head 18 are the stem portions 19 of T-shaped brackets 20, the head 18 being fitted near opposite ends with set screws 21 for engaging the stems 19 so that the brackets 20 can be fastened in adjusted position and in a spread relation to each other.

Carried upon the brackets 20 at the portions thereof at right angles to the stems 19 of the same are adjustable cups 22, these being formed with bottom eye lugs 23 carrying set screws 24 and such cups 22 by the use of the set screws 24 can be adjusted on the brackets 20 relative to each other. These cups accommodate therein the rubber feet 25 of the typewriter B when the latter is upon the stand A. In other words, the feet 25 are socketed by the said cups 22. The set screws 24 fix the cups 22 upon the brackets 20 in adjusted position so that the said cups will be accommodating to different types of standard typewriters when placed upon the stand A. These cups 22 can be turned on the brackets 20 to compensate for any irregularities in the feet of the typewriter as oftentimes these feet become defaced so that the typewriter will not rest level upon a support, the feet being usually made from rubber. Thus, it will be seen that the cups can be properly adjusted to have the typewriter rest level upon the stand.

Depending from the underside of the cross head 18 are sleeve-like bearings 26 selectably receiving a horizontal supporting rod 27, the bearings 26 being fitted with set screws 28 so that the rod may be detachably fastened in place in either bearing. This rod 27 when fixed in a bearing extends laterally to the right or the left of the stand. Upon this rod 27 is an adjustable clamp 29 accommodating a standard 30 for a work holder 31 which is adjustably carried thereby, the standard 30 being adjustable in the clamp 29 on the rod 27. This work holder 31 is for a notebook or copy work and is in the form of a plate having a rest ledge at the lower portion thereof.

Below the head 18 and enjoined with the portions 19 of the tripod is a socketed extension 32 being at right angles to the bearings 26, and carries a set screw 33 for the separable fastening therein of the rod 27, and in this manner the positioning of the rod differently from its position when in the bearings 26 can be had. The standard 30 is susceptible of adjustment in the clamp 29 so as to vary the height of the work holder 31. The work holder 31 is susceptible of adjustment on the standard to bring it closer to or away from the stand in a horizontal direction. The work holder 31 can be swung angularly to the perpendicular to allow the proper slant to the work thereon as may be required by an operator or user of the stand.

The stand can be adjusted to take care of slight variations in the level of a floor when supporting the same and it can be conveniently moved from one location to another, the typewriter being held fixed when upon the stand and all possible noises from vibration in the use of the typewriter will be eliminated.

What is claimed is:

1. A stand of the character described comprising a pedestal formed with a single upright and a head at the upper end of the upright and having supports socketed therein for adjustment of the said supports in directions at right angles to each other in a horizontal plane and turnable to a vertical plane.

2. A stand of the character described comprising a pedestal, a head at the upper end of the pedestal and having opposed individually adjustable supports fitted therewith, and cup members on said supports for turning and slidable adjustment at substantially right angles to the line of adjustment of said supports.

3. A stand of the character described comprising a pedestal, a cross head at the upper end of the pedestal, supports adjustably socketed in the head and turnable in a vertical direction and also slidably socketed in the said head, and cup members adjustable on said supports for turning and sliding movements.

4. A stand of the character described comprising a pedestal, a cross head at the upper end of the pedestal, supports adjustably socketed in the head and turnable in a vertical direction and also slidably socketed in the said head, cup members adjustable on said supports for turning and sliding movements and means for fastening the supports in adjusted position in the head.

5. A stand of the character described comprising a pedestal, a cross head at the upper end of the pedestal, supports adjustably socketed in the head and turnable in a vertical direction and also slidably socketed in the said head, cup members adjustable on said supports for turning and sliding movements, means for fastening the supports in adjusted position in the head and means for fastening the cups in adjusted position on the supports.

ELMER J. SCOTT.
EDWARD T. NISSEN.